US012014846B2

(12) United States Patent
Nakano et al.

(10) Patent No.: US 12,014,846 B2
(45) Date of Patent: Jun. 18, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Motohiro Yokoi, Mie (JP); Kenta Ito, Mie (JP); Takuya Kaba, Mie (JP); Suguru Yasuda, Mie (JP); Makoto Higashikozono, Mie (JP); Yoshitaka Kami, Osaka (JP); Yasushi Nomura, Osaka (JP); Sofia Barillaro, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 238 days.

(21) Appl. No.: 17/431,580

(22) PCT Filed: Mar. 6, 2019

(86) PCT No.: PCT/JP2019/008868

§ 371 (c)(1),
(2) Date: Aug. 17, 2021

(87) PCT Pub. No.: WO2020/179017

PCT Pub. Date: Sep. 10, 2020

(65) Prior Publication Data

US 2022/0139594 A1 May 5, 2022

(51) Int. Cl.
*H01B 7/08* (2006.01)
*H01B 7/18* (2006.01)

(52) U.S. Cl.
CPC ............. *H01B 7/0838* (2013.01); *H01B 7/18* (2013.01)

(58) Field of Classification Search
CPC ....... H01B 7/0838; H01B 7/18; H01B 7/0823
See application file for complete search history.

(56) References Cited

U.S. PATENT DOCUMENTS

| | | | | |
|---|---|---|---|---|
| 10,867,721 B2 | 12/2020 | Ishida et al. | | |
| 2007/0149021 A1* | 6/2007 | Mikami | H01R 13/6599 | 439/165 |
| 2012/0267159 A1* | 10/2012 | Gundel | H01B 7/0823 | 174/350 |

(Continued)

FOREIGN PATENT DOCUMENTS

| | | |
|---|---|---|
| JP | 62-24504 | 2/1987 |
| JP | 07-113313 | 5/1995 |

(Continued)

OTHER PUBLICATIONS

Office Action issued in Corresponding JP Patent Application No. 2019-154713, dated Nov. 22, 2022, along with an English translation thereof.

(Continued)

*Primary Examiner* — Sherman Ng
(74) *Attorney, Agent, or Firm* — Greenblum & Bernstein, P.L.C.

(57) ABSTRACT

A wiring member includes: a wire-like transmission member including a transmission wire body and a covering for covering the transmission wire body; a sheet material to which the wire-like transmission member is fixed; and a cover formed of a material different from a material of the covering, covering the wire-like transmission member from a side opposite to the sheet material, and fixed to the sheet material, wherein the sheet material includes a first fixing part to which the covering is directly fixed and a second fixing part which is directly fixed to the cover more easily (Continued)

than the first fixing part and to which the cover is directly fixed.

8 Claims, 2 Drawing Sheets

(56) References Cited

U.S. PATENT DOCUMENTS

| | | | | |
|---|---|---|---|---|
| 2014/0090883 | A1* | 4/2014 | Gundel .............. | H01B 11/1895 174/102 R |
| 2015/0222101 | A1* | 8/2015 | Kajiwara ............. | H01B 7/0045 174/138 R |
| 2017/0164528 | A1* | 6/2017 | Wakabayashi ....... | H05K 1/0228 |
| 2020/0141518 | A1 | 5/2020 | Nakano et al. | |

FOREIGN PATENT DOCUMENTS

| | | |
|---|---|---|
| JP | 2002-25369 | 1/2002 |
| JP | 2004-146109 | 5/2004 |
| JP | 2005-108754 | 4/2005 |
| JP | 2007-173056 | 7/2007 |
| JP | 2012-252976 | 12/2012 |
| JP | 2013-5623 | 1/2013 |
| JP | 2014-087191 | 5/2014 |
| JP | 2018-137208 | 8/2018 |
| JP | 2019-004679 | 1/2019 |

OTHER PUBLICATIONS

International Search Report issued in International Pat. Appl. No. PCT/JP2019/008868, dated Apr. 2, 2019, along with an English translation thereof.

Office Action issued in Corresponding JP Patent Application No. 2023-042808, dated Nov. 21, 2023, along with an English translation thereof.

Office Action issued in Corresponding JP Patent Application No. 2023-042808, dated Apr. 30, 2024, along with an English translation thereof.

* cited by examiner

WIRING MEMBER

TECHNICAL FIELD

The present disclosure relates to a wiring member.

BACKGROUND ART

Patent Document 1 discloses a wire harness including: a functional exterior member formed into a sheet-like shape; and an electrical wire disposed to overlap with the functional exterior member in at least a part of a region along a longitudinal direction, wherein at least a part of a portion where an insulating covering of the electrical wire and the functional exterior member overlap with each other is welded.

PRIOR ART DOCUMENTS

Patent Documents

Patent Document 1: Japanese Patent Application Laid-Open No. 2018-137208

SUMMARY

Problem to be Solved by the Invention

It is desired that a cover formed of a material different from that of a covering of the electrical wire is attached to a sheet material in the wire harness described in Patent Document 1.

Accordingly, an object is to provide a technique capable of favorably attaching a cover formed of a material different from that of a covering in a wire-like transmission member to a sheet material to which the covering in the wire-like transmission member is directly fixed.

Means to Solve the Problem

A wiring member according to the present disclosure includes: a wire-like transmission member including a transmission wire body and a covering for covering the transmission wire body; a sheet material to which the wire-like transmission member is fixed; and a cover formed of a material different from a material of the covering, covering the wire-like transmission member from a side opposite to the sheet material, and fixed to the sheet material, wherein the sheet material includes a first fixing part to which the covering is directly fixed and a second fixing part which is more appropriate for a direct fixation to the cover than the first fixing part and to which the cover is directly fixed.

Effects of the Invention

According to the present disclosure, the cover formed of the material different from that of the covering in the wire-like transmission member can be favorably attached to the sheet material to which the covering in the wire-like transmission member is directly fixed.

DESCRIPTION OF EMBODIMENT(S)

Description of Embodiment of Present Disclosure

Figure 1:
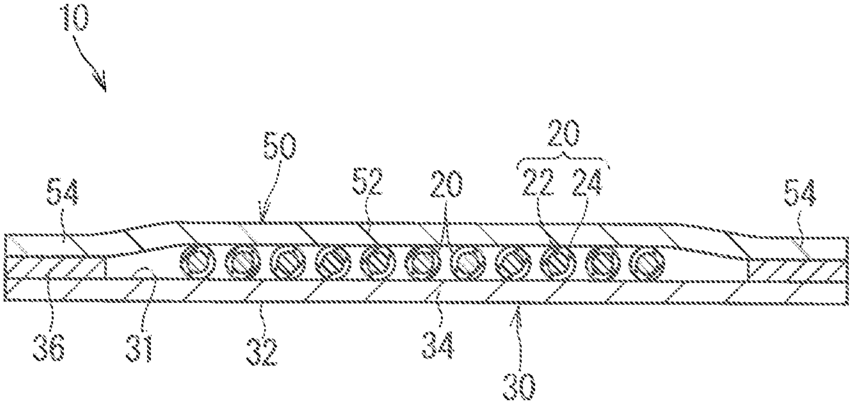
FIG. 1 is a schematic cross-sectional view illustrating a wiring member according to an embodiment 1.

Embodiments of the present disclosure are listed and described firstly.

A wiring member according to the present disclosure is as follows.

(1) A wiring member includes: a wire-like transmission member including a transmission wire body and a covering for covering the transmission wire body; a sheet material to which the wire-like transmission member is fixed; and a cover formed of a material different from a material of the covering, covering the wire-like transmission member from a side opposite to the sheet material, and fixed to the sheet material, wherein the sheet material includes a first fixing part to which the covering is directly fixed and a second fixing part which is more appropriate for a direct fixation to the cover than the first fixing part and to which the cover is directly fixed.

The cover is directly fixed to the second fixing part more appropriate for the direct fixation to the cover than the first fixing part of the sheet material, thus the cover formed of the material different from that of the covering in the wire-like transmission member can be favorably attached to the sheet material to which the covering in the wire-like transmission member is directly fixed.

Herein, the wire-like transmission member is a wire-like member transmitting electrical power or light, for example. The transmission wire body is a part of the wire-like transmission member transmitting electrical power or light. The direct fixation is a form in which resin included in at least one of the two members fixed to each other is melted, thereby stuck and fixed.

(2) It is sufficient that a space is formed in the second fixing part and the cover is directly fixed to fill at least a part of the space. The reason is that the second fixing part is directly fixed to the cover more easily than the first fixing part by an anchor effect generated by filling the space.

(3) It is considered that the wire-like transmission member is directly fixed to the first fixing part provided on one main surface of the sheet material, and the cover is directly fixed to the second fixing part provided on one main surface of the sheet material. In this case, the wire-like transmission member and the cover need not be fixed to the other main surface of the sheet material.

(4) The second fixing part of the one main surface is considered to partially overlap with the first fixing part. In this case, a usage amount of the second fixing part can be reduced.

(5) The first fixing part of the one main surface is considered to partially overlap with the second fixing part. In this case, a usage amount of the first fixing part can be reduced.

(6) It is considered that the sheet material includes a layered part in which a first layer constituting the first fixing part and a second layer constituting the second fixing part are stacked in layers, and a part of the layered part is folded back to a side of one main surface of the layered part to form the one main surface of the sheet material. In this case, the sheet-like member in which the layered part is uniformly formed is folded back, thus one main surface of the sheet material can be formed.

(7) It is also considered that the covering is directly fixed to the first fixing part provided on one main surface of the sheet material, and the cover includes a body part covering the wire-like transmission member from a side opposite to the sheet material on a side of the one main surface and a fixation part extending from an edge portion of the body part toward another main surface of the sheet material to be directly fixed to the second fixing part provided on the another main surface. In this case, the sheet material in which the layered part made up of the first layer constituting the first fixing part and the second layer constituting the second fixing part stacked in layers is uniformly formed can be used as it is as the sheet material.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment 1

Figure 2:
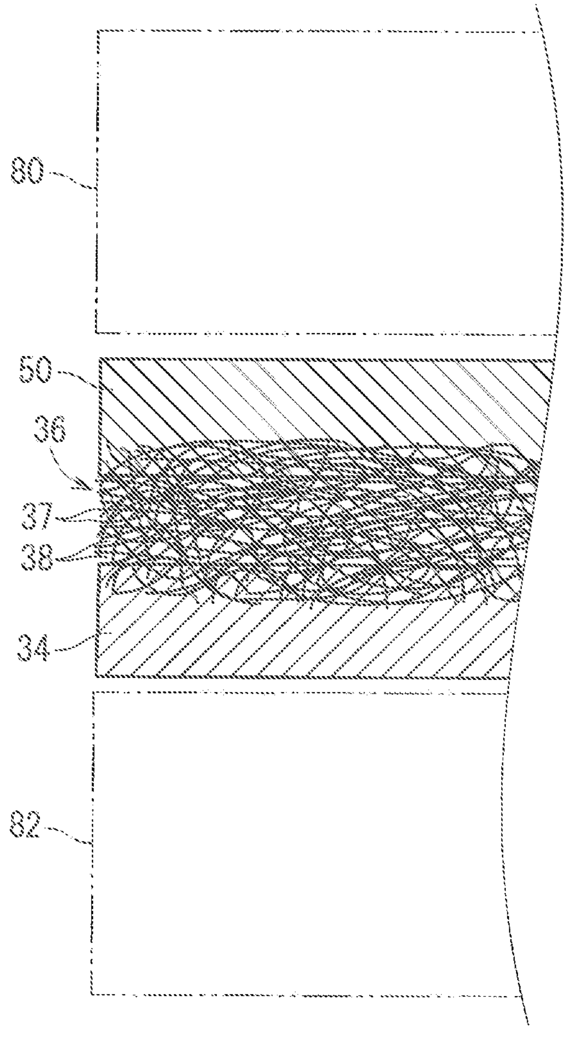
FIG. 2 is a partial enlarged view of FIG. 1.

A wiring member according to an embodiment 1 is described hereinafter. FIG. 1 is a schematic cross-sectional view illustrating a wiring member 10 according to the embodiment 1. FIG. 2 is a partial enlarged view of FIG. 1.

The wiring member 10 includes a wire-like transmission member 20, a sheet material 30 to which the wire-like transmission member 20 is fixed, and a cover 50 fixed to the sheet material 30.

It is sufficient that the wire-like transmission member 20 is a wire-like member transmitting electrical power or light, for example. The wire-like transmission member includes a transmission wire body 22 and a covering 24 covering the transmission wire body 22. For example, the wire-like transmission member 20 may be a general wire having a core wire and a covering around the core wire, or may also be a shielded wire, an enamel wire, a nichrome wire, or an optical fiber. For example, when the wire-like transmission member 20 is a general wire, a core wire in the general wire corresponds to the transmission wire body 22, and an insulating covering for covering the core wire in the general wire corresponds to the covering 24. The insulating covering in the general wire is formed of a resin material such as polyvinyl chloride (PVC) or polyethylene (PE) extrusion-molded around the core wire, for example. The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

Herein, the plurality of (eleven in FIG. 1) wire-like transmission members 20 are fixed in a parallel state to the sheet material 30. One or a plurality of wire-like transmission members 20 may be fixed. The wire-like transmission member 20 may be fixed to extend along a curved route on the sheet material 30. The plurality of wire-like transmission members 20 may be fixed to branch in a midway portion on the sheet material 30. The plurality of wire-like transmission members 20 may be fixed to intersect with each other in a midway portion on the sheet material 30.

The sheet material 30 is a sheet-like member having a main surface on which the wire-like transmission member 20 is fixed. The wire-like transmission member 20 is fixed on the main surface of the sheet material 30, thus the wire-like transmission member 20 is held along a predetermined route on the main surface. The sheet material 30 may have flexibility of easily bended, or may be a member having rigidity with a degree of being able to keep a constant shape.

The sheet material 30 includes a first fixing part 34 and a second fixing part 36. The covering 24 of the wire-like transmission member 20 is directly fixed to the first fixing part 34, thus the wire-like transmission member 20 is fixed to the sheet material 30. The cover 50 is directly fixed to the second fixing part 36, thus the cover 50 is fixed to the sheet material 30.

The direct fixation indicates that two members to be fixed are directly stuck and fixed without an intervention of an adhesive agent, for example, which is separately provided. Also considered in the direct fixation is that only resin included in one of the two members to be fixed is melted, thereby stuck and fixed, or resin included in both the two members to be fixed is melted, thereby stuck and fixed, for example. In the former case, the resin which has been melted is stuck on an outer surface of the resin on the other side, and a relatively clear interface may be formed in some cases. In the latter case, the resin included in both the members is mixed and a clear interface is not formed. Particularly when the resin included in the two members is compatible resin such as the same resin material, there may be a case where the resin in both the two members is mixed and a clear interface is not formed.

A means of forming the state of the direct fixation is not particularly limited, but various means including a known means such as welding, fusion, and melting joint can be used. For example, when the state of the direct fixation by the heat is formed by welding, various welding means such as ultrasonic welding, heating-pressurizing welding, hot air welding, and high frequency welding can be adopted. When the state of the direct fixation is formed by these means, the two members are in the state of the direct fixation by these means. Specifically, when the state of the direct fixation is formed by the ultrasonic welding, for example, the two members are in the state of the direct fixation by the ultrasonic welding. A portion where the state of the direct fixation by the heat is formed by the welding may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the present example, the first fixing part 34 and the second fixing part 36 are provided on one main surface 31 of the sheet material 30. The wire-like transmission member 20 is directly fixed to the first fixing part 34 provided on one main surface 31 of the sheet material 30. The cover 50 is directly fixed to the second fixing part 36 provided on one main surface 31 of the sheet material 30.

Herein, the sheet material 30 has a configuration in which the first fixing part 34 and the second fixing part 36 are stacked in layers. The second fixing part 36 on one main surface 31 of the sheet material 30 is formed to partially overlap with the first fixing part 34. The first fixing part 34 is a sheet-like member. For example, the first fixing part 34 is formed into an elongated rectangular shape. The wire-like transmission member 20 is directly fixed to one main surface 31 of the first fixing part 34. The second fixing part 36 is a sheet-like member formed to have a width smaller than the first fixing part 34. Herein, the second fixing part 36 is fixed in an overlapping state to a position in one main surface of the first fixing part 34 other than a portion where the wire-like transmission member 20 is fixed. The cover 50 is directly fixed to one main surface of the second fixing part 36.

A fixing state of the first fixing part 34 and the second fixing part 36 is not particularly limited, however, a direct fixation or an adhesion fixation via an inclusion such as an adhesive agent or a double-sided adhesive tape is also applicable. In the example illustrated in FIG. 2, the first fixing part 34 and the second fixing part 36 are directly fixed.

The cover 50 is formed of a material different from that of the covering 24. The cover 50 covers the wire-like transmission member 20 from a side opposite to the sheet material 30. The cover 50 includes a body part 52 and a fixation part 54. The body part 52 is a part covering the wire-like transmission member 20 from a side opposite to the sheet material 30. The fixation part 54 is a part extending from the body part 52 and directly fixed to the sheet material 30. Herein, the body part 52 collectively covers the plurality of wire-like transmission members 20. The fixation part 54 extends from an edge portion of the body part 52 and is directly fixed to an edge portion of the sheet material 30. Herein, the cover 50 is formed to have higher rigidity than the sheet material 30. The cover 50 can maintain a shape of the wiring member 10 as constant as possible.

The wire-like transmission member 20 is directly fixed to the first fixing part 34, thus the first fixing part 34 is considered a member appropriate for the direct fixation to the covering 24 in the wire-like transmission member 20 compared with the second fixing part 36.

A feature of the first fixing part 34 appropriate for the direct fixation to the wire-like transmission member 20 compared with the second fixing part 36 can be grasped as follows. That is to say, when the wire-like transmission members 20 having the same configuration are fixed to the first fixing part 34 and the second fixing part 36, respectively, under the same condition, fixation force of the wire-like transmission member 20 on the first fixing part 34 is larger than that of the wire-like transmission member 20 on the second fixing part 36. When the direct fixation is adopted as the present example, it may be considered that fixing strength in a case where at least one of a resin surface of the covering 24 and a resin surface of the first fixing part 34 is melted and solidified, thereby being stuck to the other one of the resin surfaces is larger than that in a case where at least one of a resin surface of the covering 24 and a resin surface of the second fixing part 36 is melted and solidified, thereby stuck to the other one of the resin surfaces.

A material constituting the first fixing part 34 is not particularly limited as long as the above condition is satisfied, however, it is sufficient to select the material in relation to a material constituting the covering 24. It is sufficient that the covering 24 and the first fixing part 34 are made up of the same resin or same type of resin as a material. For example, when the covering 24 is formed of resin of PVC as a main component, it is sufficient that the first fixing part 34 is also formed of resin of PVC as a main component.

The first fixing part 34 is a solid sheet-like member with an inner portion evenly filled. This configuration is for being able to increase the fixing strength even when a contact area between the first fixing part 34 and the wire-like transmission member 20 is small when a direct fixing state thereof is generated. Particularly herein, a horizontal section of the wire-like transmission member 20 has a circular shape, thus the contact area between the wire-like transmission member 20 and the first fixing part 34 tends to be small.

When a member appropriate for the fixation of the wire-like transmission member 20 is adopted as the first fixing part 34, there is a possibility that the member is inappropriate for the fixation to the cover 50. Thus, a favorable fixation to the cover 50 is achieved by the second fixing part 36. That is to say, the second fixing part 36 is considered a member appropriate for the direct fixation to the cover 50 compared with the first fixing part 34.

A feature of the second fixing part 36 appropriate for the direct fixation to the cover 50 compared with the first fixing part 34 can be grasped as follows. That is to say, when the covers 50 having the same configuration are fixed to the first fixing part 34 and the second fixing part 36, respectively, under the same condition, fixation force of the cover 50 on the second fixing part 36 is larger than that of the cover 50 on the first fixing part 34. When the direct fixation is adopted as the present example, it may be considered that fixing strength in a case where at least one of a resin surface of the cover 50 and a resin surface of the second fixing part 36 is melted and solidified, thereby being stuck to the other one of the resin surfaces is larger than that in a case where at least one of a resin surface of the cover 50 and a resin surface of the first fixing part 34 is melted and solidified, thereby stuck to the other one of the resin surfaces.

A material constituting the second fixing part 36 and a structure thereof are not particularly limited as long as the above condition is satisfied, however, it is sufficient to select the material and the structure in relation to a material constituting the cover 50 and a structure thereof. Herein, a space 38 is formed in the second fixing part 36, thus the second fixing part 36 is more appropriate for the direct fixation to the cover 50 than the first fixing part 34. That is to say, the cover 50 is directly fixed to fill at least a part of the space 38. Accordingly, an anchor effect is generated between the cover 50 and the second fixing part 36 in the state where the cover 50 is directly fixed to the second fixing part 36. In other words, the cover 50 and the second fixing part 36 are mainly fixed by a physical action of the anchor effect, thus chemical fixing strength on the cover 50, for example, needs not be considered as the second fixing part 36, and a type of material which can be selected increases.

When the second fixing part 36 is more appropriate for the direct fixation to the cover 50 than the first fixing part 34, it is also applicable that the physical action of the anchor effect, for example, is not mainly used, but a chemical action of hydrogen bonding and van der Waals' force is mainly used. For example, when the second fixing part 36 is made up of the same resin material as that of the cover 50 or the same type of resin material, and the first fixing part 34 is made up of a different type of resin material having low adhesion on the cover 50, it may be considered that the second fixing part 36 is more appropriate for the direct fixation to the cover 50 than the first fixing part 34 by the chemical action.

The configuration of the space 38 in the second fixing part 36 is not particularly limited. For example, it is also applicable that a member constituting the second fixing part 36 is made up of a non-woven cloth or a porous member such as resin foam so that each pore in the porous portion forms the space 38. For example, it is also applicable that a member constituting the second fixing part 36 is a mesh-like member so that the mesh forms the space 38. For example, it is also applicable that a member constituting the second fixing part 36 is a knitting member or a woven member so that a space between threads constituting the knitting member or the woven member functions as the space 38. It is also applicable that a groove, a concave, or a slit, for example, is formed in the surface of the solid sheet-like second fixing part 36 or a hole passing through the second fixing part 36 is formed to be the space 38. The resin constituting the cover 50 fills at least a part of the space 38, thus the anchor effect is generated between the cover 50 and the second fixing part 36, and the cover 50 and the second fixing part 36 are firmly fixed to each other. At this time, it is sufficient that the cover 50 and the second fixing part 36 have a surface contact with each other in a region larger than a region where one wire-like transmission member 20 has contact with the first fixing part 34.

When the second fixing part 36 includes the space 38, a material constituting the second fixing part 36 is not particularly limited. It is sufficient that at least a part of the space 38 remains until a melted material of the cover 50 enters the space 38 at the time of the direct fixation. For example, it is sufficient that a melting point of a material forming the second fixing part 36 is subsequently equal to or higher than that of a material of the cover 50. Accordingly, it can be suppressed that the second fixing part 36 is melted earlier than the cover 50 and the space 38 in the second fixing part 36 is filled with the second fixing part 36 and wholly disappears. It is not necessary to set the melting point of the material constituting the second fixing part 36 to be subsequently equal to or higher than that of the material constituting the cover 50. Even in a case where the melting point of the material constituting the second fixing part 36 is lower than that of the material constituting the cover 50, when the second fixing part 36 is concentratively heated at the time of direct fixation of the cover 50 and the second fixing part 36, at least a part of the space 38 can remain until the melted material of the cover 50 enters the space 38 at the time of direct fixation.

It is considered that the second fixing part 36 is formed of polyethylene terephthalate (PET) as a material, and the cover 50 is formed of nylon, PET, or polypropylene (PP) as a material, for example.

The cover 50 is a solid sheet-like member or a closed pore foam, for example, and has high rigidity to be harder than the sheet material 30. For example, the cover 50 is a solid sheet-like member or a closed pore foam formed of a material such as nylon, PET, and PP, and the sheet material 30 is a soft member in which a solid sheet-like member made of soft PVC as a material and a non-woven cloth made of PET as a material are stacked in layer.

It is sufficient that the first fixing part 34 and the second fixing part 36 are fixed to each other before the cover 50 is fixed to the second fixing part 36. The first fixing part 34 and the second fixing part 36 may be directly fixed, or may also adhere to each other by an inclusion such as an adhesive agent or a double-sided adhesive tape. In the example illustrated in FIG. 2, the solid sheet-like first fixing part 34 fills a part of the space 38 (the space 38 on a side of the first fixing part 34) in the second fixing part 36 which is a non-woven cloth, thus the first fixing part 34 and the second fixing part 36 are directly fixed to each other. At this time, the space 38 remains in the second fixing part 36 on a side opposite to the side of the first fixing part 34 in a state where the first fixing part 34 and the second fixing part 36 are fixed to each other. The resin constituting the cover 50 fills the remaining space 38, thus the cover 50 and the second fixing part 36 are directly fixed to each other.

The cover 50 and the second fixing part 36 are sandwiched between pressure members 80 and 82, thereby being pressurized, heated, and directly fixed to each other. At least one of the pressure members 80 and 82 may be a heating member. When the cover 50 and the second fixing part 36 are sandwiched between the pressure members 80 and 82, the first fixing part 34 is also sandwiched.

According to the wiring member 10, the cover 50 is directly fixed to the second fixing part 36 which is directly fixed to the cover 50 more easily than the first fixing part 34 in the sheet material 30, thus the cover 50 formed of a material different from that of the covering 24 in the wire-like transmission member 20 can be favorably attached to the sheet material 30 to which the covering 24 in the wire-like transmission member 20 is directly fixed.

The space 38 is formed in the second fixing part 36, and the cover 50 is directly fixed to fill the space 38, thus the second fixing part 36 can be directly fixed to the cover 50 more easily than the first fixing part 34 by the anchor effect generated by filling the space 38.

The wire-like transmission member 20 is directly fixed to the first fixing part 34 provided on one main surface 31 of the sheet material 30, and the cover 50 is directly fixed to the second fixing part 36 provided on one main surface 31 of the sheet material 30, thus the wire-like transmission member 20 and the cover 50 need not be fixed to the other main surface of the sheet material 30. The second fixing part 36 on one main surface 31 is formed to partially overlap with the first fixing part 34, thus a usage amount of the second fixing part 36 can be reduced.

Embodiment 2

Figure 3:
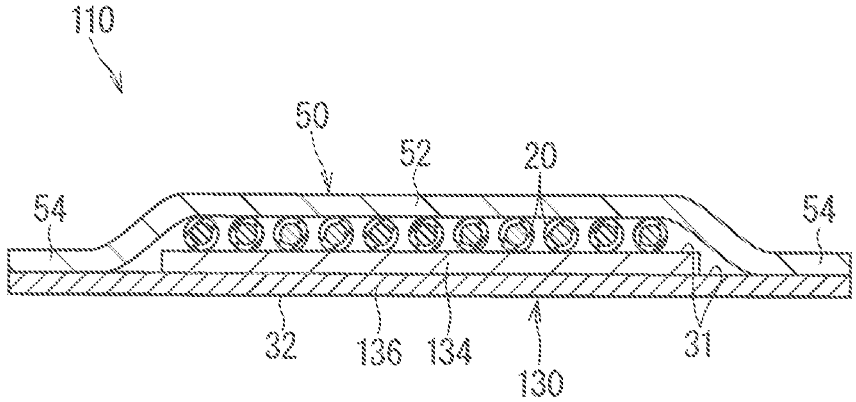
FIG. 3 is a schematic cross-sectional view illustrating a wiring member according to an embodiment 2.

A wiring member according to an embodiment 2 is described. FIG. 3 is a schematic cross-sectional view illustrating a wiring member 110 according to the embodiment 2. In the following description of the present embodiment, the same reference numerals are assigned to the similar constituent elements described above, and the description thereof will be omitted. The same applies to the description of each embodiment hereinafter.

Also in the present example, a first fixing part 134 and a second fixing part 136 are provided on one main surface 31 of a sheet material 130. In the present example, the first fixing part 134 on one main surface 31 partially overlaps with the second fixing part 136. Specifically, the first fixing part 134 is a sheet-like member formed into an elongated rectangular shape, for example. The second fixing part 136 is a sheet-like member formed into an elongated rectangular shape having a width larger than the first fixing part 134. The first fixing part 134 partially overlaps with one main surface of the second fixing part 136.

In the example illustrated in FIG. 3, the first fixing part 134 is fixed to a middle portion of one main surface of the second fixing part 136 other than a side edge portion thereof. The first fixing part 134 is located on a middle portion of one main surface 31 of the sheet material 130 in a width direction. The side edge portion of one main surface of the second fixing part 136 is located on an end portion of one main surface 31 of the sheet material 130 in a width direction. The plurality of wire-like transmission members are directly fixed side by side to the first fixing part 134, and a side edge portion of the cover 50 is directly fixed to the side edge portion of the one main surface of the second fixing part 136.

As described above, when the first fixing part 134 on one main surface 31 partially overlaps with the second fixing part 136, the usage amount of the first fixing part 134 can be reduced.

In the example illustrated in the embodiment 2, there may be a portion where the first fixing part 134 is not provided in a middle portion of one main surface 31 of the sheet material 130 in a width direction. That is to say, the plurality of first fixing parts 134 each having a small width may be provided on the second fixing part 136 with a space therebetween in the width direction. In this case, the middle portion of one main surface of the second fixing part 136 is located on one main surface 31 of the sheet material 130. At this time, the middle portion of the cover 50 in the width direction may be directly fixed to the middle portion of one main surface of the second fixing part 36 located on one main surface 31 of the sheet material 130.

Embodiment 3

Figure 4:
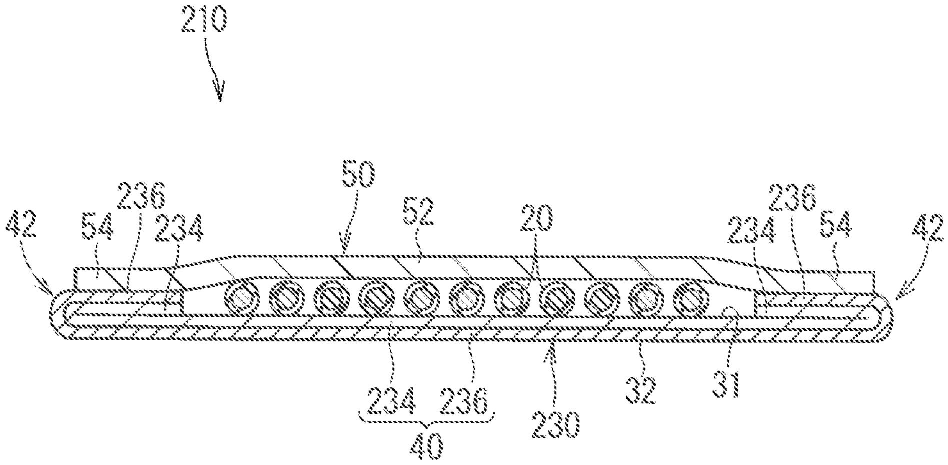
FIG. 4 is a schematic cross-sectional view illustrating a wiring member according to an embodiment 3.

A wiring member according to an embodiment 3 is described. FIG. 4 is a schematic cross-sectional view illustrating a wiring member 210 according to the embodiment 3.

Also in the present example, a first fixing part 234 and a second fixing part 136 are provided on one main surface 31. In the present example, a part of the sheet-like member constituting the sheet material 230 is folded back, thus the first fixing part 234 and the second fixing part 136 are provided on one main surface 31.

Specifically, the sheet material 230 includes a layered part 40 in which a first layer constituting the first fixing part 234 and a second layer constituting the second fixing part 236 are stacked in layers. A part of the layered part 40 is folded back to a side of one main surface of the layered part 40. Formed accordingly is the sheet material 230 in which the first fixing part 234 and the second fixing part 236 are provided on one main surface 31.

Herein, a sheet-like member in which the layered part 40 is uniformly formed is used as the sheet-like member before being folded back. That is to say, used is a sheet-like member in which the sheet-like member constituting the first layer and the sheet-like member constituting the second layer are formed to have the same size and stacked in layers with no mutual protrusion to wholly constitute the layered part 40.

Herein, the first layer and the second layers are stacked so that they constitute one main surface and the other main surface, respectively, in the layered part 40. An end portion of the layered part 40 is folded back to a side of one main surface so that the first layer is located inside. Accordingly, the first fixing part 234 is located on a middle portion of one main surface 31 of the sheet material 230 in a width direction, and the second fixing part 236 is located on an end portion thereof in the width direction. The plurality of wire-like transmission members 20 are directly fixed side by side to the first fixing part 234, and a side edge portion of the cover 50 is directly fixed to the side edge portion of the one main surface 31 of the second fixing part 236.

A folding part 42 in which a part of the layered part 40 is folded back is directly fixed to the cover 50, thereby being kept in a folded shape, for example. For example, the folding part 42 is kept in a folded shape by a folding line. A folding shape maintaining part maintaining a folding shape may be provided separately on the folding part 42. Adoptable as such a folding shape maintaining part is a configuration that surfaces of the folding part 42 facing each other (the main surface of the first layer in the example illustrated in FIG. 3) are directly fixed, or adhesively fixed via an inclusion such as an adhesive agent or a double-sided adhesive tape, for example. Adoptable as such a folding shape maintaining part is a configuration that both side portions of a folding line in the folding part 42 are sewn by a thread, or stapled by a stapler, for example.

As described above, when the sheet material 230 includes the layered part 40 in which the first layer constituting the first fixing part 234 and the second layer constituting the second fixing part 236 are stacked in layers, and the part of the layered part 40 is folded back to the side of the one main surface of the layered part 40 to form one main surface 31 of the sheet material 230, the sheet-like member in which the layered part 40 is uniformly formed is folded back, thus one main surface 31 of the sheet material 230 can be formed.

Embodiment 4

Figure 5:
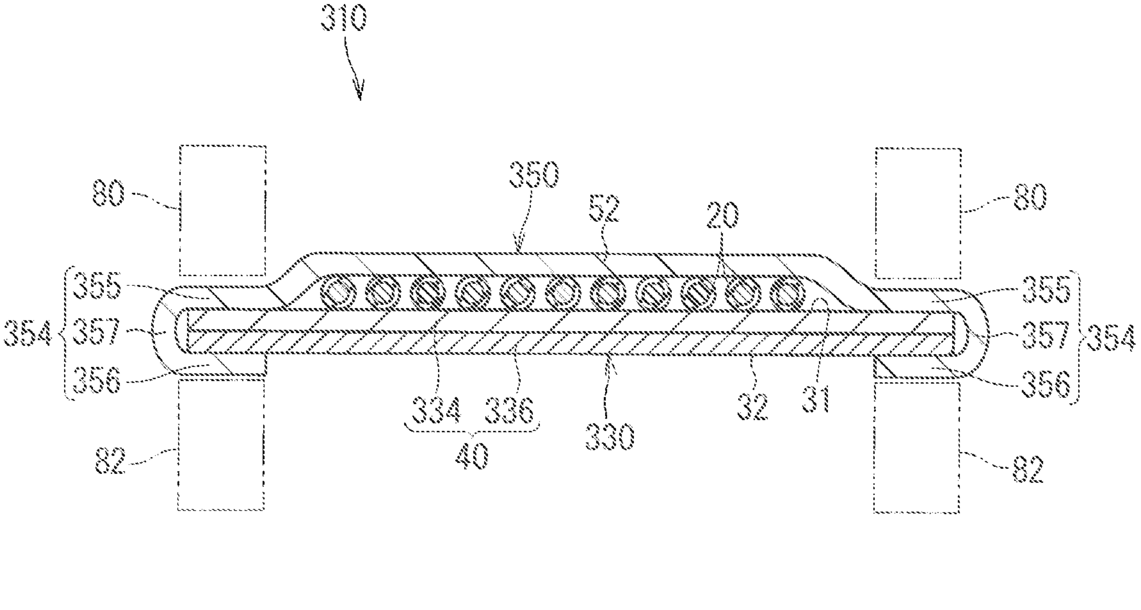
FIG. 5 is a schematic cross-sectional view illustrating a wiring member according to an embodiment 4.

A wiring member according to an embodiment 4 is described. FIG. 5 is a schematic cross-sectional view illustrating a wiring member 310 according to the embodiment 4.

In the present example, the covering 24 of the wire-like transmission member is directly fixed to a first fixing part 334 provided on one main surface 31 of a sheet material 330. A cover 350 is directly fixed to a second fixing part 336 provided on the other main surface 32 of the sheet material 330. At this time, a shape of a fixation part 354 of the cover 350 is different from that of the fixation part 54 of the cover 50 described above. The fixation part 354 extends from the edge portion of the body part 52 toward the other main surface 32. At this time, the fixation part 354 includes a base end part 355 connected to the body part 52 and covering one main surface 31 of the sheet material 330, a tip part 356 covering the other main surface 32 of the sheet material 330, and a connection part 357 connecting the base end part 355 and the tip part 356. The connection part 357 is bended from a side of one main surface 31 toward a side of the other main surface 32 of the sheet material 330. The tip part 356 is directly fixed to the second fixing part 336 provided on the other main surface 32 of the sheet material.

In the sheet material 330, the first fixing part 334 is provided on one main surface 31, and the second fixing part 336 is provided on the other main surface 32. A sheet-like member similar to the sheet-like member before being folded back in the embodiment 3 is used for the sheet material 330. That is to say, the sheet-like member including the layered part in which the first layer constituting the first fixing part 334 and the second layer constituting the second fixing part 336 are stacked in layers is uniformly formed is used as it is. As described above, in the present example, the sheet-like member including the layered part 40 in which the first layer constituting the first fixing part 334 and the second layer constituting the second fixing part 336 are stacked in layers is uniformly formed can be used as it is as the sheet material 330.

A sheet material other than the sheet-like member in which the layered part 40 is uniformly formed may be adopted as the sheet material 330. For example, the sheet material 30 described in the embodiment 1 may be used reversely in a front-back direction. The sheet materials 130 and 230 described in the embodiment 2 and the embodiment 3 may be used without change in the front-back direction, for example.

It is sufficient that the tip part 356 in the fixation part 354 is directly fixed to a position in the second fixing part 336 provided on the other main surface 32 of the sheet material 330 other than a portion overlapping with the wire-like transmission member 20. The reason is that when the cover 350 and the sheet material 330 are directly fixed to each other, the wire-like transmission member 20 needs not be sandwiched between the pressure members 80 and 82 as illustrated in FIG. 5.

The base end part 355 in the fixation part 354 may be or may not be directly fixed to one main surface 31 of the sheet material 330. For example, when the cover 350 and the sheet material 330 are directly fixed, as illustrated in FIG. 5, the base end part 355 in the fixation part 354 may also be sandwiched between the pressure members 80 and 82 and directly fixed to the sheet material 330.

In the example illustrated in FIG. 5, a portion of one main surface 31 of the sheet material 330 facing the base end part 355 in the fixation part 354 is the first fixing part 334. In this case, when the sheet material 330 and the cover 350 are directly fixed to each other on one main surface 31 of the sheet material 330, fixation strength thereof is smaller than that of a portion of the other main surface 32 of the sheet material 330 where the sheet material 330 and the cover 350 are directly fixed to each other (a portion where the second fixing part 336 and the tip part 356 are directly fixed to each other). When the cover 350 in the present example is adopted as the sheet material 330 for the sheet material 130 descried in the embodiment 2, the portion of one main surface 31 of the sheet material 130 facing the base end part 355 in the fixation part 354 is the second fixing part 336. In this case, when the sheet material 130 and the cover 350 are directly fixed to each other on one main surface 31 of the sheet material 130, fixation strength thereof is substantially equal to that of a portion of the other main surface 32 of the sheet material 130 where the sheet material 130 and the cover 350 are directly fixed to each other (a portion where the second fixing part 136 and the tip part 356 are directly fixed to each other).

When the fixation part 354 of the cover 350 is fixed to the other main surface 32 of the sheet material 330 as with the present example, a protrusion dimension of the fixation part 354 in a front-back direction of the body part 52 gets large in the cover 350. At this time, when a base material of the cover 350 is a sheet-like member having high rigidity, the protrusion dimension of the fixation part 354 in the front-back direction of the body part 52 gets large in the cover 350, thus rigidity of the wiring member 310 can be further increased, and the shape of the wiring member 310 can be easily maintained.

The configurations described in the embodiments and modification examples thereof can be appropriately combined as long as they are not contradictory.

EXPLANATION OF REFERENCE SIGNS

10, 110, 210, 310 wiring member
20 wire-like transmission member
22 transmission wire body
24 covering
30, 130, 230, 330 sheet material
31 one main surface
32 other main surface
34, 134, 234, 334 first fixing part
36, 136, 236, 336 second fixing part
37 fiber
38 space
40 layered part
42 folding part
50, 350 cover
52 body part
54, 354 fixation part
355 base end part
356 tip part
357 connection part
80, 82 pressure member

The invention claimed is:

1. A wiring member, comprising:
a wire-like transmission member including a transmission wire body and a covering for covering the transmission wire body;
a sheet material to which the wire-like transmission member is fixed; and
a cover formed of a material different from a material of the covering, covering the wire-like transmission member from a side opposite to the sheet material, and fixed to the sheet material, wherein
the sheet material includes a first fixing part to which the covering is directly fixed and a second fixing part which is more appropriate for a direct fixation to the cover than the first fixing part and to which the cover is directly fixed, and
the first fixing part and the second fixing part include a resin material, and the resin material in the first fixing part is configured to directly fix to the covering and the resin material in the second fixing part is configured to directly fix to the cover without an adhesive agent.

2. The wiring member according to claim 1, wherein
a space is formed in the second fixing part, and
the cover is directly fixed to fill at least a part of the space.

3. The wiring member according to claim 1, wherein
the wire-like transmission member is directly fixed to the first fixing part provided on one main surface of the sheet material, and
the cover is directly fixed to the second fixing part provided on one main surface of the sheet material.

4. The wiring member according to claim 3, wherein
the second fixing part of the one main surface partially overlaps with the first fixing part.

5. The wiring member according to claim 3, wherein
the first fixing part of the one main surface partially overlaps with the second fixing part.

6. The wiring member according to claim 3, wherein
the sheet material includes a layered part in which a first layer constituting the first fixing part and a second layer constituting the second fixing part are stacked in layers, and a part of the layered part is folded back to a side of one main surface of the layered part to form the one main surface of the sheet material.

7. The wiring member according to claim 1, wherein
the covering is directly fixed to the first fixing part provided on one main surface of the sheet material, and
the cover includes a body part covering the wire-like transmission member from a side opposite to the sheet material on a side of the one main surface and a fixation part extending from an edge portion of the body part toward another main surface of the sheet material to be directly fixed to the second fixing part provided on the another main surface.

8. A wiring member, comprising:
a wire-like transmission member including a transmission wire body and a covering for covering the transmission wire body;
a sheet material to which the wire-like transmission member is fixed; and
a cover formed of a material different from a material of the covering, covering the wire-like transmission member from a side opposite to the sheet material, and fixed to the sheet material, wherein the sheet material includes a first fixing part to which the covering is directly fixed and a second fixing part which is more appropriate for a direct fixation to the cover than the first fixing part and to which the cover is directly fixed, a space is formed in the second fixing part, and the cover is directly fixed to fill at least a part of the space.

* * * * *